Feb. 12, 1957 G. W. FYLER 2,781,475

TELEVISION RECEIVER

Filed April 1, 1954 2 Sheets-Sheet 1

INVENTOR.
George W. Fyler,
BY
Mueller & Aichele
Attys.

TELEVISION RECEIVER

Filed April 1, 1954 2 Sheets-Sheet 2

INVENTOR.
George W. Fyler,
BY
Mueller & Aichele
Attys.

2,781,475
Patented Feb. 12, 1957

2,781,475

TELEVISION RECEIVER

George W. Fyler, Lombard, Ill., assignor to Motorola, Inc., Chicago, Ill., a corporation of Illinois Application April 1, 1954, Serial No. 420,235

21 Claims. (Cl. 315—27)

Figures 1, 2, 3:
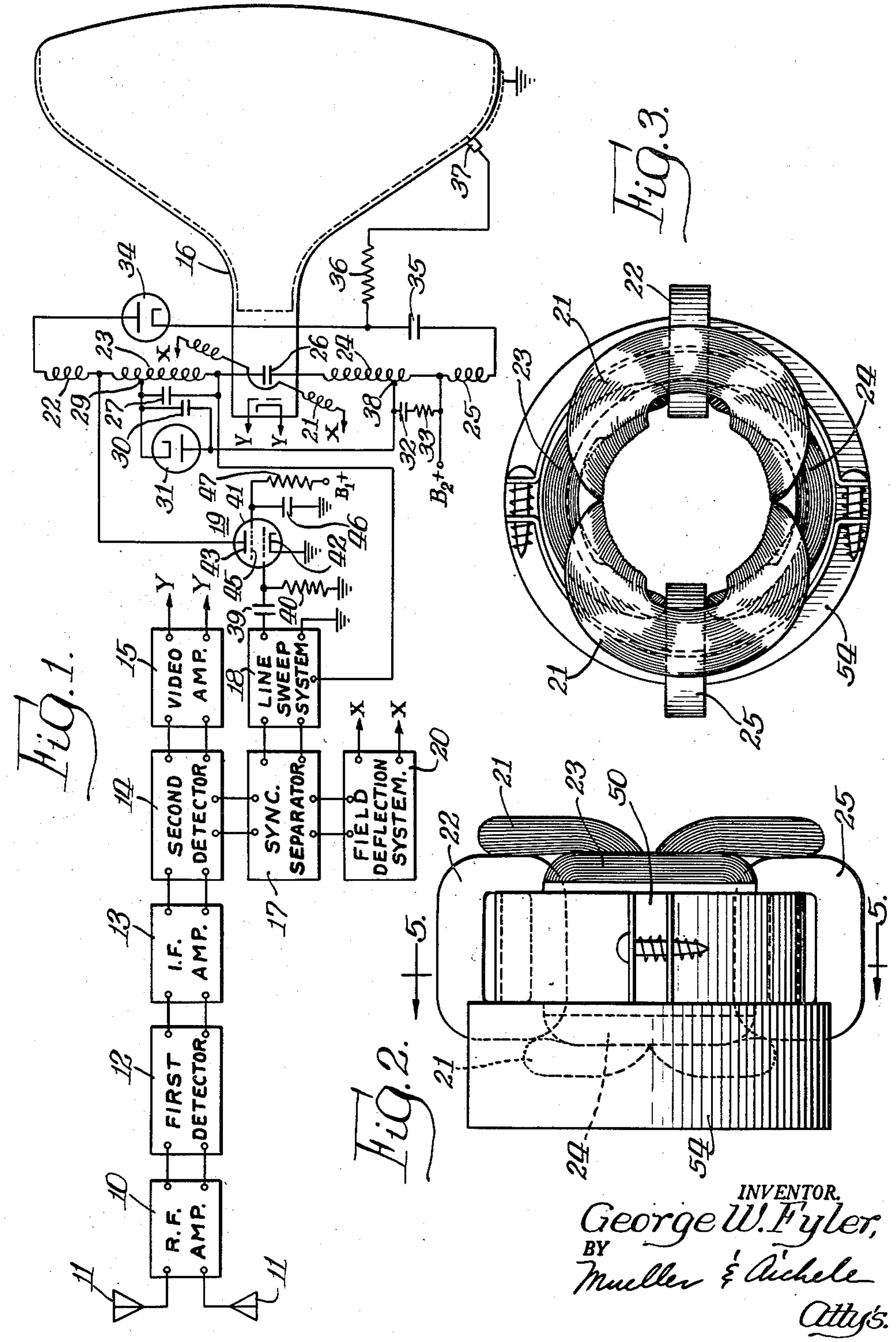

The present invention relates to television receivers, and more particularly to an improved system for deflecting the cathode-ray beam of the image reproducer of a television receiver and for providing a high-voltage accelerating potential for the beam.

In the present day television receivers, the line or horizontal deflection system for the image reproducer constitutes one of the most complicated and costly portions of the receiver. This system, in addition to automatic frequency control synchronizing stages and discharge stages, usually includes a power amplifier output stage coupled through a transformer to the line deflection yoke of the reproducer. A suitable damping circuit is also provided to suppress ringing signals and generally improve the operating characteristics of the deflection system, and this circuit is usually coupled across the transformer.

In the early development of the television art, considerable losses were experienced in the line deflection system from energy dissipated in the damping circuit. This condition was obviated to a great extent by the provision of "boost" or "bootstrap" circuits which utilized the energy normally dissipated in the damping circuit to effect a boost in the unidirectional voltage supplied to the power amplifier output stage. This provided a material increase in the operating efficiency of the system. At this point in the art it was considered essential to use a step-down output transformer in order to obtain high voltage and damping currents of proper magnitude so that power feedback into the unidirectional potential supply circuit of the power amplifier could be readily released. Such a transformer, of course, represented additional costs in circuit construction as well as the introduction of inherent losses due to leakage and shunt inductances, coil and core losses. Direct drive bootstrap deflection systems have been devised, however, in which the anode of the power output stage is directly coupled to the deflection yoke, and which do not require such an output transformer.

However, the prior art direct drive arrangements for the deflection yoke in television receivers have failed to realize the efficiency obtainable or to fulfill adequately all the requirements of present day systems, namely, the production of high-voltage accelerating potential for the beam accelerating anode of the image reproducer. This potential is usually obtained by stepping up the retrace pulses developed in the line deflection system by means of an additional winding on the output transformer. Therefore, there is no convenient source for such high voltage pulses in the prior art direct drive systems, and it has been suggested that a separate transformer be used in the system solely for the production of these high voltage pulses. However, this defeats one of the purposes of a direct drive arrangement which is to obviate the need for transformers in the deflection system.

It is, accordingly, an object of the present invention to provide in a television receiver an improved deflection system of the direct drive type in which the inadequacies of the prior art arrangements are successfully overcome.

Another object of the invention is to provide such a deflection system which is constructed to overcome the requirement for an output transformer and the attendant costs and losses associated therewith, yet which is constructed to develop more efficiently the boost voltage leading to higher overall efficiency, and also to develop a high-voltage accelerating potential for the cathode-ray beam of the image reproducer of the receiver.

It is, therefore, the general object of the present invention to provide in a television receiver a line deflection system that exhibits extremely favorable operating characteristics, yet which utilizes fewer components and is less costly than prior art systems of this general type.

A feature of the invention is the provision in a television receiver of a direct drive deflection system for the image reproducer, in which the deflection yoke of the reproducer is included directly in the anode circuit of the power amplifier stage of the deflection system, and in which high-voltage windings are provided directly on the yoke and connected so that a high-voltage unidirectional beam-accelerating potential may be derived therefrom without disturbing the normal operation of the yoke.

Another feature of the invention is the provision of such deflection system which incorporates suppressor circuits to suppress ringing signals that the inclusion of such high-voltage windings on the deflection yoke has tendency to produce.

Another feature of the invention is the provision of a yoke structure for the image reproducer of a television receiver which includes high-voltage windings mounted upon the magnetic core of the yoke.

Figures 4, 5, 6, 7:
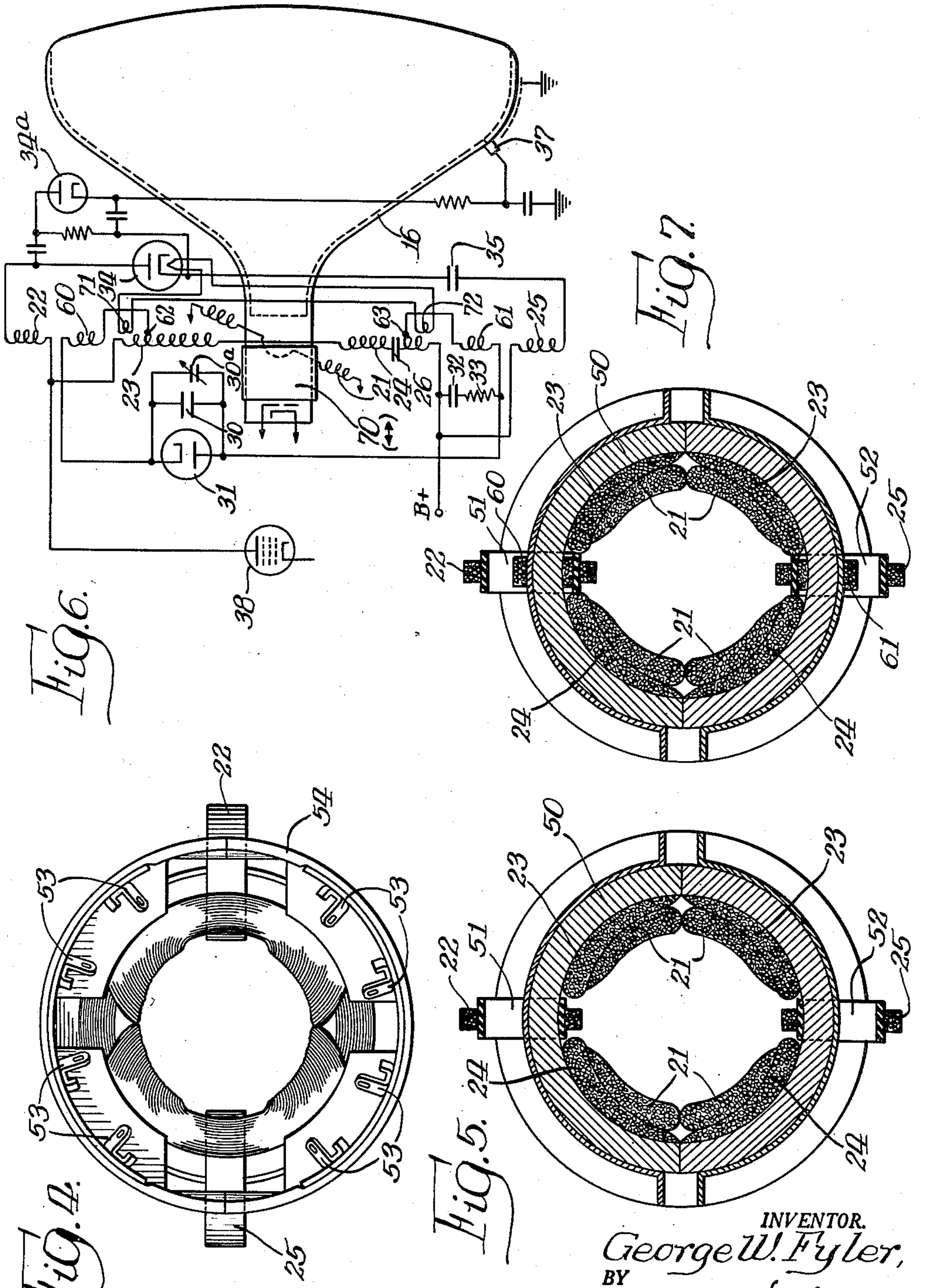

The above and other features of the invention which are believed to be new are set forth with particularity in the appended claims. The invention itself, however, together with further objects and advantages thereof may best be understood by reference to the following description when taken in conjunction with the accompanying drawing in which:

Fig. 1 shows a television receiver incorporating the improved deflection system of the present invention, Figs. 2–5 show various views of an improved yoke for the image reproducer of the receiver of Fig. 1, constructed in accordance with the invention, Fig. 6 shows a portion of the receiver of Fig. 1, and illustrates the improved deflection system of the invention in a modified form, and Fig. 7 shows a sectional view of a yoke for use in conjunction with the circuit of Fig. 6.

The invention is applicable to a television receiver of the type using an electromagnetically deflected cathode ray image reproducer, and comprises a deflection yoke winding for producing a magnetic field in the reproducer, and a sweep system for supplying a periodic deflection signal to the deflection winding and including an output stage directly coupled to the winding. The invention also comprises at least one additional winding inductively coupled to the deflection winding, and rectifying means coupled to the additional winding for developing a unidirectional potential from the energy derived therefrom.

The television receiver of Fig. 1 includes a radio frequency amplifier 10 of one or more stages, and this amplifier has input terminals connected to an antenna 11 and output terminals coupled through a first detector 12 to an intermediate frequency amplifier 13 of any desired number of stages. The output terminals of intermediate frequency amplifier 13 are coupled through a second detector 14 to a video amplifier 15. The output terminals of video amplifier 15 (labeled Y—Y) are connected to the input electrodes of a cathode ray image reproducer 16 (also labeled Y—Y).

Second detector 14 is coupled to a synchronizing signal separator 17. Separator 17 has output terminals connected to a line sweep system 18, and the sweep system is coupled to the line deflection winding sections 23, 24 of reproducer 16 through an output stage 19. Separator 17 has further output terminals connected to a field deflection system 20 which, in turn, has output terminals (labeled X—X) which are connected to the field deflection elements 21 (whose terminals are also labeled X—X) of reproducer 16.

The operation of the television receiver thus far described is briefly as follows:

A television signal intercepted by antenna 11 is amplified by radio frequency amplifier 10 and heterodyned to the selected intermediate frequency of the receiver in first detector 12. The resulting intermediate-frequency signal is amplified in amplifier 13 and detected in second detector 14 so as to produce a composite video signal. The composite video signal is amplified in video amplifier 15 and applied to the input electrodes of reproducer 16 to control the intensity of the cathode ray beam therein in accordance with the image intelligence.

The synchronizing components of the television signal are separated from the composite video signal by separator 17, the line synchronizing components being utilized to synchronize the line sweep system 18 and the field synchronizing components being utilized to synchronize field deflection system 20. In this manner, the deflections of the cathode-ray beam in reproducer 16 are synchronized with the received television signal so that the reproducer is able to synthesize the image represented thereby.

The sound portion of the television receiver forms no part of the present invention and, for that reason, has not been shown.

As previously stated, the present invention is particularly concerned with the output stage 19 of the line deflection system, and this stage will be described in detail. The output terminals of sweep system 18 are connected to ground and through a capacitor 39 to the control electrode of an electron discharge device 41, the control electrode being connected to a point of reference potential or ground through a grid resistor 40. Device 41 is connected to constitute the power amplifier output stage of the line deflection system, and the device has a cathode 42 directly connected to ground, a screen electrode 45 connected through a resistor 47 to the positive terminal $B_1+$ of a source of unidirectional potential and bypassed to ground through an optional capacitor 46, and an anode 43 directly connected to the outer end of section 23 of the line deflection winding.

The sections 23 and 24 of the line deflection winding have their inner ends coupled together through a bootstrap capacitor 26, and the outer end of section 24 is connected to a positive terminal $B_2+$ of a source of unidirectional potential. A damping diode, or other suitable unilaterally conductive device, 31 has a cathode connected to a tap 29 on winding section 23 and has an anode connected to a tap 38 on winding section 24, the diode being shunted by a capacitor 30. Taps 29, 38 are connected near the outer ends of sections 23, 24 so that the yoke coil distribution is essentially unchanged for the output tube and damper tube currents for satisfactory linearity, low deflection defocussing, and high efficiency. Moreover, these taps are tapped down by equal amounts on the yoke sections so that a balanced condition is maintained and the same amount of current flows through both yoke sections. This balanced condition causes the yoke sections to produce bucking fields with no residual flux circulating around the core with attendant losses and adverse effects on the high-voltage developed by the yoke. A further capacitor 27 is coupled between tap 29 and the inner extremity of section 23 to balance stray capacity currents in winding sections 23 and 24. A pair of high voltage windings 22, 25 (positioned on the yoke in a manner to be described) is inductively coupled to winding sections 23, 24, and the high-voltage windings are respectively connected in series with the outer extremities of sections 23, 24. These high voltage windings have the same number turns to maintain the balanced condition discussed above, and they are connected in opposite directions to develop respectively high-voltage pulses of opposite polarity. A rectifying device 34 and a capacitor 35 are series-connected across the outer ends of windings 22, 25, and the junction of the rectifying device and capacitor is connected to the high-voltage terminal 37 of reproducer 16 through a resistor 36 of a relatively high resistance so as to provide no appreciable damping for winding 25. Terminal 37 is connected to the beam accelerating anode of the image reproducer.

The line sweep system 18 supplies a peaked sawtooth voltage wave to the control electrode of power amplifier 41 in accordance with well established television practice. This voltage causes the amplifier to produce a current flow through winding sections 23, 24 and bootstrap condenser 26 from the positive terminal $B_2+$. Damper diode 31 and shunting capacitor 30, which are connected to the respective taps 29, 38 on the winding sections, function in well-known manner to suppress ringing currents and assist in the production of the desired current flow in the yoke for linear sweep of the beam across the face of the image reproducer. The energy from the damping circuit produces a constant unidirectional voltage across bootstrap capacitor 26, and this voltage is added to the voltage from the positive terminal $B_2+$ to boost the unidirectional potential supplied to anode 43 of amplifier 41.

Voltage pulses are developed across the winding sections 23, 24 during the line retrace intervals, as is well known, and these pulses are stepped up to a relatively high amplitude by the series-connected, inductively-coupled high-voltage windings 22, 25. The resulting high-voltage pulses are rectified by device 34 and filtered by elements 35, 36 to produce a relatively high unidirectional accelerating potential which is applied to the accelerating electrode of reproducer 16 through terminal 37.

The lower yoke coil damper tap 38 and the capacity between the cathode of the damper tube 31 and its filament have a tendency to produce 500 kilocycle ringing currents, and these currents are effectively suppressed by a capacitor 32 and series resistor 33 connected between the positive terminal $B_2+$ and tap 38. The unbalanced distributed capacity of the yoke coils has a tendency to produce 250 kilocycle ringing currents, and these latter ringing currents are effectively suppressed by capacitor 27 connected from tap 29 on winding section 23 to the inner end of that winding.

The actual arrangement of the high-voltage windings on the deflection yoke is illustrated in Figs. 2–5. As shown in these figures, the yoke includes an open ended cylindrical shaped magnetic core 50. The line deflection winding sections 23, 24 are disposed within the core on opposite sides of the internal surface thereof with the sides of one of the sections being respectively adjacent but spaced from the sides of the other of these sections, and with each of the sections having a plurality of turns extending longitudinally through the core with connecting loops bent outwardly at the ends of the core.

The field deflection windings 21 are generally similar to the line deflection windings, and are mounted in the core within and overlapping the line winding sections and angularly displaced 90° with respect thereto. Both the field and line deflection windings are preferably distributed to maintain a sharp focus of the cathode ray beam of device 16 as it is scanned over the viewing screen.

The high-voltage windings 22 and 25 with a radial disposition surround the core, and each of these windings has a plurality of turns extending longitudinally through the bore of the core between the respective adjacent sides of the line deflection winding sections. The high voltage deflection windings are mounted on suitable coil forms 51, 52 as shown in Fig. 5. The various terminals from the windings of the yoke may be terminated in contacts 53 secured to a suitable cylindrical mounting structure 54 attached to one end of the yoke.

With the deflection system described above, the need for an output transformer is dispensed with, and the power amplifier 41 is directly coupled to the line deflection winding sections 23, 24. Moreover, the deflection system is connected to develop a suitable bootstrap voltage for the amplifier. High voltage for the accelerating electrode of the reproducer is developed by the provision of the high-voltage windings directly on the yoke, and any ringing currents produced by the high-voltage windings are suppressed by means of the described circuitry.

The system described above has been constructed and has been found to operate with a high degree of efficiency. In a constructed embodiment of the invention, the following constants and structural details were used, and these are given merely by way of example and are not intended to limit the invention in any way.

| | |
|---|---|
| Capacitor **26** | .25 microfarads. |
| Resistor **33** | 1,000 ohms. |
| Capacitor **32** | 720 micromicrofarads. |
| Windings **22, 25** | 1150 turns each for minimum ringing—No. 38 enameled wire—layer wound at 25 turns per layer (continuous winding). Width of each layer ⅛ inches. |
| Inter-layer insulation | Paper—1 mil. Width of coil form ¼ inches. |
| Capacitor **27** | 120 micromicrofarads. |
| $B_2+$ | 160 volts. |
| Diode **31** | 6AU4. |
| Rectifying device **34** | 1B3. |
| Capacitor **35** | 500 micromicrofarads. |
| Resistor **36** | 1 megohm. |
| Bootstrap voltage | 600 volts (without load). |
| High voltage | 13,400 volts. |
| Winding sections **23, 24** | 360 turns each No. 30 wire. |
| Taps **29** and **38** | Tapped down 60 turns from respective ends of winding sections **23, 24**. |

The embodiment of Fig. 6 further includes a pair of damping windings 60, 61. As shown in Fig. 7, these windings may be wound tightly around the core under coil forms 51 and 52. The damping windings 60, 61 are inductively coupled to respective ones of the high-voltage windings and to the deflection winding sections 23, 24 by virtue of the flux in core 50. The inner respective ends of the damping windings are connected to taps 62, 63 on respective winding sections 23, 24 which correspond to taps 29 and 38 in the embodiment of Fig. 1. The damper diode 31 and shunting capacitor 30 are, in this embodiment, connected across the outer ends of the damping windings, and the elements 32, 33 are connected between the positive terminal $B_2+$ and the outer end of winding 61.

Windings 60, 61 suppress a ringing caused by the high voltage coils 22, 25. The frequency of this ringing is determined, for example, by the number of turns in these coils, as well as the size, shape, dielectric and wire size of the coils. The damper windings may be tuned by capacitor 30 to the particular ringing frequency present in any particular circuit. These windings preferably have at least 30 turns each, and capacitor 30 is adjusted for minimum ringing at this frequency. Taps 62 and 63 are preferably tapped about 60 turns each down the corresponding winding sections 23, 24.

The turns of the damping windings 60, 61 are wound so that flux in core 50 produced by the damper current in winding sections 23, 24 is in the same direction as the flux in the core produced by the damper current in damping windings 60, 61. It has been found that with the arrangement of the damping windings described above, the ringing currents due to the high voltage coils are suppressed for all practical purposes.

It is sometimes desirable to provide bootstrap voltage to other utilization circuits in the receiver, and it is then preferable to interpose the bootstrap capacitor 26 directly in winding section 24 just above tap 63 (as shown in Fig. 6), rather than between the winding sections as illustrated in Fig. 1. This arrangement requires less decoupling for these utilization circuits.

Horizontal size control is best achieved by a control that varies the deflection flux in the yoke without materially affecting the high voltage developed across windings 22, 25. This may conveniently be achieved by the provision of a variable capacitor **30*a* in shunt with capacitor 30 across the damper diode 31. Any variation of capacitor 30*a* varies the horizontal size without materially affecting the high voltage except for a slight variation due to the resulting change in the retrace time due to the variation of that capacitor. Capacitor 30*a* can be connected in series with capacitor 30 instead of in shunt. Alternately, an inductance coil can be connected across capacitor 30 for controlling the horizontal size in the place of capacitor 30*a***.

Size may also be controlled by providing a thin cylinder 70 (Fig. 6) of copper or other suitable material around the neck of reproducer 16. The cylinder is movable along the neck from the rear of the reproducer and under the yoke coils to control size. This cylinder has the effect of reducing the deflection flux in the reproducer tube with a small reduction in the yoke inductance so as to give the desired decrease in retrace time with corresponding constancy or slight increase in the high voltage. The field flux and vertical size are relatively unaffected by the horizontal size change due to the relatively low frequencies involved in the field deflection.

Other methods of size control may be used such as varying the screen voltage of device 38, damping the yoke with a resistor, or by loading the bootstrap voltage with a D. C. load. However, all these latter methods have a tendency to produce variations in the high voltage, and are not as desirable as those described previously.

As shown in Fig. 6, the filament current for the high voltage rectifier may be conveniently obtained by winding a single turn 71, 72 around each yoke section 23, 24. These turns are connected in series across the filament of device 34.

When it is desired to increase the high voltage, a voltage doubler arrangement with a second rectifier **34*a***, such as shown in Fig. 6, can be used.

The high voltage coils 22, 25 of Figs. 1 and 6 need not take the form shown in Figs. 2–5 and 7, but may be formed by continuing the winding sections 23, 24 of the horizontal yoke. That is, extra turns may be provided for these winding sections around the yoke turns to function as the high voltage coils. It is preferable that a relatively small size of wire such as #38 or #40 be used for the extra turns so that a sufficient number of turns may be made in the volume available. With this construction it has been found that higher voltages may be obtained than with the construction shown in Figs. 1–5 and 7. Moreover, the latter construction eliminates any unbalanced core flux with the resulting adverse effects thereof as described previously herein. In addition, increased coupling between the yoke sections and the high voltage coils is realized.

The invention provides, therefore, an improved and simplified deflection system for the image reproducer of a television receiver. This deflection system does not require the usual output transformer with the additional cost and losses attendant thereto. Moreover, the improved and simplified deflection system of the invention is capable of providing adequate bootstrap voltage and also of providing the required high voltage for the accelerating anode of the image reproducer.

While particular embodiments of the invention have been shown and described, modifications may be made and it is intended in the appended claims to cover all such modifications as fall within the true spirit and scope of the invention.

I claim:

1. In a television receiver of the type utilizing an electromagnetically deflected cathode-ray image reproducer, the combination of a deflection yoke winding for producing a magnetic field in the image reproducer, a sweep system for supplying a periodic deflection signal to said deflection winding and including an output stage coupled to said winding, at least one high-voltage winding inductively coupled to said deflection winding and connected to develop a voltage high compared with the voltage developed across said deflection winding, and rectifying means coupled to said high-voltage winding for developing a unidirectional potential from energy derived therefrom.

2. In a television receiver of the type utilizing an electromagnetically deflected cathode-ray image reproducer, the combination of a deflection yoke winding for producing a magnetic field in the image reproducer, a sweep system for supplying a periodic deflection signal to said deflection winding and including an output stage directly coupled to said winding, a pair of additional windings inductively coupled to said deflection winding and respectively connected to the extremities thereof in series therewith, and rectifying means coupled across said series-connected deflection and additional windings for developing a unidirectional potential from energy derived therefrom.

3. In a television receiver of the type utilizing an electromagnetically deflected cathode-ray image reproducer, the combination of a deflection yoke winding for producing a magnetic field in the image reproducer having one extremity connected to a source of unidirectional potential, a sweep system for supplying a periodic deflection signal to said deflection winding and including an electron discharge device amplifier with an anode directly connected to the other extremity of said winding, damping means connected across at least a portion of said winding, a pair of additional windings inductively coupled to said deflection winding and respectively connected to the extremities thereof in series therewith, and rectifying means coupled across said series-connected deflection and additional windings for developing a unidirectional potential from energy derived therefrom.

4. In a television receiver of the type utilizing an electromagnetically deflected cathode-ray image reproducer, the combination of a deflection yoke winding for producing a magnetic field in the image reproducer comprising a pair of series-coupled sections, a sweep system for supplying a periodic deflection signal to said deflection winding and including an output stage directly coupled to said winding, damping means including a unilaterally conductive device connected across at least a portion of said winding, ringing signal suppressor means including a capacitor connected across at least a portion of the other of said winding sections, a pair of additional windings inductively coupled to said deflection winding and respectively connected to the extremities thereof in series therewith, and rectifying means coupled across said series-connected deflection and additional windings for developing a unidirectional potential from energy derived therefrom.

5. In a television receiver of the type utilizing an electromagnetically deflected cathode-ray image reproducer, the combination of a deflection yoke winding for producing a magnetic field in the image reproducer comprising a pair of sections, bootstrap capacitor means series-connected in circuit with said sections, a sweep system for supplying a periodic deflection signal to said deflection winding and including an output stage directly coupled to said winding, damping means including a unilaterally conductive device connected across at least a portion of said winding, a pair of additional windings inductively coupled to said deflection winding and respectively connected to the extremities thereof in series therewith, and rectifying means coupled across said series-connected deflection and additional windings for developing a unidirectional potential from the energy derived therefrom.

6. In a television receiver of the type utilizing an electromagnetically deflected cathode-ray image reproducer, the combination of a deflection yoke winding for producing a magnetic field in the image reproducer comprising a pair of sections each having an inner end and an outer end and with the outer end of one of said sections being connected to a source of unidirectional potential, bootstrap capacitor means coupling together said inner ends of said sections, a sweep system for supplying a periodic deflection signal to said deflection winding and including a discharge device amplifier having an anode directly connected to said outer end of the other of said sections, damping means including a unilaterally conductive device connected from a tap on said one of said sections to a tap on said other of said sections, ringing signal suppressor means including a capacitor connected from said tap on said other section to said inner end thereof, further ringing signal suppressor means including a capacitor and a series resistor connected from said tap on said one section to said outer end thereof, a pair of additional windings inductively coupled to said deflection winding and respectively connected to said outer ends of said sections, and rectifying means coupled across said deflection and additional windings for developing a unidirectional potential from the energy derived therefrom.

7. In a television receiver of the type utilizing an electromagnetically deflected cathode-ray image reproducer, the combination of a deflection yoke winding for producing a magnetic field in the image reproducer, a sweep system for supplying a periodic deflection signal to said deflection winding and including an output stage directly coupled to said winding, a pair of high voltage windings inductively coupled to said deflection winding and respectively connected to the extremities thereof in series therewith, rectifying means coupled across said series-connected deflection and high voltage windings for developing a unidirectional potential from energy derived therefrom, a pair of damping windings inductively coupled to respective ones of said high voltage windings and to said deflection winding, said damping windings each having one end connected to respective taps on said deflection winding, and damping means including a unilaterally conductive device connected across the other ends of said damping windings.

8. In a television receiver of the type utilizing an electromagnetically deflected cathode-ray image reproducer, the combination of a deflection yoke winding for producing a magnetic field in the image reproducer comprising a pair of sections each having an inner end and an outer end and with the outer end of one of said sections being connected to a source of unidirectional potential, bootstrap capacitor means coupling together said inner ends of said sections, a sweep system for supplying a periodic deflection signal to said deflection winding and including a discharge device amplifier having an anode directly connected to said outer end of the other of said sections, a pair of high voltage windings inductively coupled to said deflection winding and respectively connected to said outer ends of said sections, rectifying means coupled across said deflection and high voltage windings for developing a unidirectional potential from the energy derived therefrom, a pair of damping windings inductively coupled to respective ones of said high voltage windings and to said deflection winding sections, said damping windings each having one end connected to a tap on respective ones of said deflection winding sections, damping means including a unilaterally conductive device and a shunting capacitor means connected across the other ends of said damping windings, and ringing signal suppressor including a capacitor and a series resistor connected between said other end of one of said damping windings and said source of unidirectional potential.

9. A deflection yoke for a cathode-ray image reproducer including in combination, an open-ended cylindrical shaped magnetic core, a pair of deflection winding sections disposed within said core on opposite sides of the internal surface thereof with the sides of one of said sections being respectively adjacent the sides of the other of said sections, each of said sections having a plurality of turns extending longitudinally through said core with connecting loops bent radially outwardly at the ends of said core, and at least one radially disposed additional winding surrounding said core and having a plurality of turns extending longitudinally through said core between one pair of the adjacent sides of said deflection winding sections.

10. A deflection yoke for a cathode-ray image reproducer including in combination, a pair of deflection winding sections adapted to be mounted in facing relation on a neck portion of the image reproducer with the longitudinal sides of one of said sections being respectively adjacent the longitudinal sides of the other of said sections, each of said sections having a plurality of turns extending longitudinally with respect to the neck portion with connecting loops at each end thereof bent radially outwardly, and at least one radially disposed additional winding having a plurality of turns extending longitudinally between one pair of the adjacent sides of said deflection winding sections.

11. A deflection yoke for a cathode-ray image reproducer including in combination, an open-ended cylindrical shaped magnetic core, a pair of deflection winding sections disposed within said core on opposite sides of the internal surface thereof with the sides of one of said sections being respectively adjacent the sides of the other of said sections, each of said sections having a plurality of turns extending longitudinally through said core with connecting loops bent radially outwardly at the ends of said core, and a pair of radially disposed additional windings surrounding said core and each having a plurality of turns extending longitudinally through said core between the respective adjacent sides of said deflection winding sections.

12. A deflection yoke for a cathode-ray image reproducer including in combination, an open-ended cylindrical shaped magnetic core, a pair of deflection winding sections disposed within said core on opposite sides of the internal surface thereof with the sides of one of said sections being spaced from the respective sides of the other of said sections, each of said sections having substantially 300 turns and said turns extending longitudinally through said core with connecting loops bent radially outwardly at the ends of said core, and a pair of radially disposed additional windings surrounding said core and each having substantially 950 turns, with said last-mentioned turns extending longitudinally through said core between the respective adjacent sides of said deflection winding sections.

13. A deflection yoke for a cathode-ray image reproducer including in combination, an open-ended cylindrical shaped magnetic core, a pair of deflection winding sections disposed within said core on opposite sides of the internal surface thereof with the sides of one of said sections being respectively adjacent the sides of the other of said sections, each of said sections having a plurality of turns extending longitudinally through said core with connecting loops bent radially outwardly at the ends of said core, a radially-disposed high voltage winding surrounding said core and having a plurality of turns extending longitudinally through said core between one pair of the adjacent sides of said deflection winding sections, and a radially-disposed damping winding surrounding said core coaxially with said high voltage winding.

14. A deflection yoke for a cathode-ray image reproducer including in combination, an open-ended cylindrical shaped magnetic core, a pair of deflection winding sections disposed within said core on opposite sides of the internal surface thereof with the sides of one of said sections being respectively adjacent the sides of the other of said sections, each of said sections having a plurality of turns extending longitudinally through said core with connecting loops bent radially outwardly at the ends of said core, a pair of radially-disposed high voltage windings surrounding said core and each having a plurality of turns extending longitudinally through said core between the respective adjacent sides of said deflection winding sections, and a pair of radially-disposed damping windings surrounding said core and respectively disposed within said high voltage windings and coaxial therewith.

15. In a television receiver of the type utilizing an electromagnetically deflected cathode-ray image reproducer, the combination of a deflection yoke winding for producing a magnetic field in the image reproducer comprising a pair of series-connected sections, bootstrap capacitor means interposed in one of said sections, a sweep system for supplying a periodic deflection signal to said deflection winding and including an output stage directly coupled to said winding, damping means including a unilaterally conductive device connected across at least a portion of said winding, a pair of additional windings inductively coupled to said deflection winding and respectively connected to the extremities thereof in series therewith, and rectifying means coupled across said series-connected deflection and additional windings for developing a unidirectional potential from the energy derived therefrom.

16. In a television receiver of the type utilizing an electromagnetically deflected cathode-ray image reproducer, the combination of a deflection yoke winding for producing a magnetic field in the reproducer and comprising a pair of series-connected yoke sections, bootstrap capacitor means interposed in series circuit with said yoke sections intermediate the outer ends of the series combination of said sections, damping means including a unilaterally conductive device connected from a tap on one of said yoke sections to a tap on the other of said yoke sections and embracing said bootstrap capacitor means, and a sweep system for supplying a periodic deflection signal to said deflection yoke winding and including an output stage directly coupled to said winding.

17. The combination defined in claim 16 in which said bootstrap capacitor means is interposed in one of said yoke sections.

18. In a television receiver of the type utilizing an electromagnetically deflected cathode-ray image reproducer, the combination of a deflection yoke winding for producing a magnetic field in the image reproducer and comprising first and second series-connected yoke sections each having essentially the same number of turns, bootstrap capacitor means interposed in series circuit with said yoke sections intermediate the outer ends of the series combination of said sections, damping means including a unilaterally conductive device connected from a first intermediate tap on said first yoke section to a second intermediate tap on said second yoke section and embracing said bootstrap capacitor means, said first intermediate tap being situated a selected number of turns of said first yoke section from the extremity thereof and said second intermediate tap being in a position corresponding to the same number of turns of said second yoke section from the extremity thereof, and a sweep system for supplying a periodic deflection signal to said deflection yoke winding and including an output stage directly connected to said extremity of said first yoke section.

19. The combination defined in claim 18 in which said bootstrap capacitor means is interposed between said first and second yoke sections.

20. In a television receiver of the type utilizing an electromagnetically deflected cathode-ray image reproducer, the combination of a deflection yoke winding for producing a magnetic field in the reproducer and comprising a pair of series-connected yoke sections, bootstrap capacitor means interposed in series circuit with said yoke sections intermediate the outer ends of the series combination of said sections, damping means including a unilaterally conductive device connected from a tap on one of said yoke sections to a tap on the other of said yoke sections and embracing said bootstrap capacitor means, a sweep system for supplying a periodic deflection signal to said deflection yoke winding and including an output stage directly coupled to said winding, and rectifying means coupled across said yoke sections for developing a unidirectional potential for the cathode ray image reproducer.

21. In a television receiver of the type utilizing an electromagnetically deflected cathode-ray image reproducer, the combination of a deflection yoke winding for producing a magnetic field in the image reproducer and comprising first and second series-connected yoke sections each having essentially the same number of turns, bootstrap capacitor means interposed in series circuit with said yoke sections intermediate the outer ends of the series combination of said sections, damping means including a unilaterally conductive device connected from a first intermediate tap on said first yoke section to a second intermediate tap on said second yoke section and embracing said bootstrap capacitor means, said first intermediate tap being situated a selected number of turns of said first yoke section from the extremity thereof and said second intermediate tap being in a position corresponding to the same number of turns of said second yoke section from the extremity thereof, a sweep system for supplying a periodic deflection signal to said deflection yoke winding and including an output stage directly connected to said extremity of said first yoke section, and rectifying means coupled across said yoke sections for developing a unidirectional potential for the cathode-ray image reproducer, said rectifying means including first and second rectifying elements connected in a voltage doubler circuit.

References Cited in the file of this patent

UNITED STATES PATENTS

| | | |
|---|---|---|
| 2,077,574 | Maloff | Apr. 20, 1937 |
| 2,185,134 | Schlesinger | Dec. 26, 1939 |
| 2,482,737 | Shaw | Sept. 20, 1949 |
| 2,555,828 | Barco | June 5, 1951 |
| 2,555,829 | Barco | June 5, 1951 |
| 2,555,830 | Barco | June 5, 1951 |
| 2,562,941 | Parker | Aug. 7, 1951 |